United States Patent [19]

Setti et al.

[11] 4,301,013

[45] Nov. 17, 1981

[54] SPIRAL MEMBRANE MODULE WITH CONTROLLED BY-PASS SEAL

[75] Inventors: Duilio Setti, Lexington, Mass.; Peter M. Balbo, Londonderry, N.H.

[73] Assignee: Abcor, Inc., Wilmington, Mass.

[21] Appl. No.: 186,337

[22] Filed: Sep. 11, 1980

[51] Int. Cl.³ ................... B01D 31/00; B01D 13/00
[52] U.S. Cl. ................... 210/637; 210/652; 210/137; 210/433.2; 210/450
[58] Field of Search ............... 55/158; 210/321.5, 137, 210/637, 652, 433.2, 450

[56] References Cited

U.S. PATENT DOCUMENTS 3,339,341  9/1967  Maxwell et al. ............ 55/158 X
3,510,004  5/1970  Hoeltzenbein ............ 210/321.5
3,542,203  11/1970  Hancock et al. ............ 210/321.5

*Primary Examiner*—Frank A. Spear, Jr.
*Attorney, Agent, or Firm*—Richard P. Crowley

[57] ABSTRACT

A membrane apparatus, which apparatus comprises a housing and a spiral membrane module positioned in the housing to define an annular clearance space between the outside wall of the spiral membrane module and the interior wall surface of the housing, and an open-mesh type or netting material peripherally surrounding the spiral membrane module and positioned in the annular clearance space in a partial sealing relationship, to provide a controlled by-pass of the feed stream through the open-mesh-type material in the annular clearance space, to prevent accumulation of feed material in the annular space.

24 Claims, 3 Drawing Figures

SPIRAL MEMBRANE MODULE WITH CONTROLLED BY-PASS SEAL

BACKGROUND OF THE INVENTION

Spiral-wound membranes and modules containing spiral-wound membranes have been employed in the past in connection with both reverse-osmosis and ultrafiltration operation processes. Typical spiral-wound membranes are described, for example, in U.S. Pat. Nos. 3,367,504 and 3,367,505. Spiral-wound membranes have particular advantages for many applications, due to the high surface-to-volume ratio, low hold-up volume and generally uniform flow patterns, and typically such spiral-wound membranes are less expensive than tubular or hollow-fiber membranes.

Spiral-wound membranes employed in ultrafiltration processes may be used for concentrating cheese whey through the retention of over 95% of the proteins in the cheese whey, as well as the concentration of proteins in milk, or for concentrating enzymes and biologicals produced by fermentation and biological extraction processes. Such spiral-wound membranes also may be employed in the depyrogenating of pharmaceutical process water, concentrating and purifying vaccines and blood fractions, concentrating gelatins, albumin with egg solids, fractionating and concentrating soy whey protein, recovering textile sizing from desized waste, recovering lignosulfonate from waste streams, recovering spent tannery baths and waste solvents and otherwise upgrading or separating liquids.

Typically, a spiral-wound membrane or envelope is wound up about a perforated central tube and is disposed within a module housing. One impediment to the application of spiral membrane modules, particularly in the sanitary field, such as in the dairy and pharmaceutical field, has been the effective cleaning and sanitizing around the exterior of the module in the annular space between the membrane module and the module housing. Spiral membrane modules must be cleaned and sanitized easily in a variety of sizes in the field and during operation, particularly when used with the concentration of whey in the dairy field.

Attempts to provide for the cleaning and sanitizing of the annular space about the exterior of the spiral-wound membrane have included the use of a so-called "leaky brine seal", as set forth in U.S. Pat. No. 4,064,052, issued Dec. 20, 1977. This patent discloses a spiral-wound module within a housing module, wherein one or more small holes are placed in an annular lip seal within the annular space between the spiral-wound membrane and the interior wall of the housing. This lip seal, containing a plurality of holes, permits a small controlled flow of the feed stream to by-pass the module continually through the annular space and prevents any stagnation or accumulation of product or residue behind the seal. However, this approach is not wholly satisfactory and has various manufacturing cost and operational difficulties associated with its practice.

Therefore, it is desirable to provide an improved spiral-wound membrane apparatus which provides ease in maintaining the sanitation and cleanliness of the module in operation and in the field.

SUMMARY OF THE INVENTION

The invention relates to a spiral-wound membrane apparatus and to a method of manufacturing and using such an apparatus, which provides for a controlled by-pass of the feed stream around and in an annular space about the exterior of the spiral-wound membrane in the module, to prevent stagnation of product within the annular space.

The invention relates to a membrane apparatus, which apparatus comprises a housing which is adapted to contain a spiral-wound membrane, the housing having an interior wall surface, and the spiral-wound membrane module having an exterior wall surface, the spiral-wound membrane module positioned within the housing module, and which defines a generally annular clearance space between the exterior wall surface of the spiral-wound membrane and the interior surface of the housing module. The spiral-wound membrane module is designed to separate a feed stream into a permeate stream and into a concentrate stream. The membrane module typically contains a means to introduce a feed stream into the interior of the housing module and to permit the feed stream to flow axially through the membrane envelope from one to the other end of the housing, and typically contains a centrally disposed, perforated, interior tube, about which the membrane envelope or the spiral-wound membrane is wound, and which contains a plurality of holes therein, and from which tube a permeate stream is removed at the other end of the membrane module, and a means to remove a concentrate stream from the other end of the membrane module, after having the feed stream pass axially from the one to the other end of the membrane module.

It has been discovered that an effective, easily manufactured and simple controlled by-pass around the exterior of the spiral-wound membrane module may be obtained by the use of an open-type-mesh or netting material positioned within the annular space and peripherally wound about and surrounding the spiral membrane in the annular clearance space. The open-type-mesh material provides a close, partial, sealing relationship between the exterior wall of the spiral membrane and the interior wall of the housing module, and yet provides a controlled by-pass of the feed stream in the annular clearance space, to improve the cleanliness of the space and to prevent the stagnation of products therein. The use of the open-type-mesh material in the annular clearance space allows the easy, close fitting of various sizes of spiral membrane modules in the housing module through the employment of the mesh material of particular or varying thickness. The use of an open-mesh material also permits control of the by-pass through control of the angle of the strands or fibers of the mesh material employed and the spacing of the mesh strands or fibers in the mesh material.

The mesh material, of course, should be made of a material which is not affected by the feed stream and, typically, is composed of a synthetic- or polymeric-type material, either woven or nonwoven, or of an extruded polymeric netting. The mesh material may be applied as a sock-type material which is merely slid over the spiral membrane in a tight, close-fitting fashion, and then the spiral membrane, with the tightly fitting sock, is then slid into the housing module. The open-mesh material may be placed in a spiral or helical overwrap about the spiral membrane, or merely be placed in a single or multiple thickness and abutted, secured or unsecured, axially along the material length.

Generally, the open-mesh material employed extends axially and substantially along the length of the membrane in the annular clearance space. Typically, the open-mesh material is placed over the general central portion of the spiral membrane, since spiral membrane modules tend to be somewhat larger at each end, and the placing of the open-mesh material, to control bypass, in the general central portion of the spiral membrane module can be used to compensate for the reduction in diameter of the membrane, or for variation in manufacturing tolerances of the module or membrane.

The open-mesh material may vary in thickness, as desired, depending on the annular clearance space, but often ranges from about 5 to 100 mils in thickness, and typically 10 to 80 mils in thickness; for example, 40 to 70 mils. The mesh material may be composed of a mesh material having an open, uniform spacing, such as rectangular, square, diamond-shaped, circular or otherwise, and may represent an extruded, netting-type material which has an open-face area of approximately 50% or more.

In the axial flow direction, the open area may vary, and the mesh material has strands, so that the material may flow between the strands and above and below the strands, as required, to obtain the desired amount of controlled by-pass required for each particular operation and process. The mesh material may be composed of uniformly spaced strands of high- or low-density polyolefins, such as polyethylene, or polypropylene or polyester, nylon or other materials. The open-mesh material may be selected and positioned to provide for sufficiently controlled by-pass, to keep the annular clearance space free of material, and the controlled by-pass flow, depending on the process and module, may range from 1 to 20 gallons per minute or more; for example, from 3 gpm to 12 gpm.

The open-mesh material is employed about a spiral membrane having a generally smooth, outer-wrap surface, with the housing module having a smooth, interior wall surface. If desired, the mesh material may comprise a small fraction of the axial length within the module. The mesh material may be left unsecured or be secured in a peripheral position with adhesives or other means, if desired.

The spiral-wound membrane employed within the housing module is a helically wound membrane envelope which comprises a polymeric membrane having a face and a back surface, a permeate-collection sheet material; for example, a tricot material, and a feed channel spacer of open-mesh material. The sheet materials in the spiral membrane are formed together in the following order: a spacer sheet; a first membrane sheet having a face and a back; the spacer sheet against the face of the membrane sheet; a permeate-collection sheet against the back of the front membrane sheet; and a second membrane sheet, with the back against the opposite surface of the permeate-collection sheet; and the sequence repeated. The edges of the adjoining permeate-collection sheets are secured together, to form a permeate-collection channel communicating with the central tube. The spiral membrane is wound about the central tube, and the outer, exterior surface is sealed with a resin coating, such as a thermosetting resin, such as a cured epoxy resin, to form a smooth, sealing surface. The variation in the coating and the diameter of the spiral-wound membrane provide for variation in the annular clearance space in the module housing, particularly when the spiral membrane is replaced in the field.

In operation, the feed solution is introduced at the one end of the spiral-wound membrane and flows axially across the face of the membrane, and permeate is removed from the feed-channel spacer and moves inwardly into the perforated central tube and is withdrawn centrally, while concentrate is removed axially from the other end.

The use of the open-mesh-strand material provides many advantages, both in manufacture and operation, in that the mesh material may fit various sizes of modules and may permit the spiral-wound membrane to be closefitting within the module housing, and, therefore, prevent spiral modules which are too loose within the housing. The use of the open-mesh material permits the use of a smooth surface on the interior surface of the module and on the membrane, which is more sanitary. The selection of the mesh and angle of strands and the thickness of the material permit control of the amount of flow by-pass desired.

Further, the open-mesh material permits ease of installation and removal of the spiral-wound modules in the field, when such modules must be replaced, and also permits the hand-cleaning of the outside of the spiralwound membrane outside of the housing in the field. The open-mesh material, which is somewhat resilient, overcomes possible variations in the diameter of the membrane, since the open-mesh material can be installed in the proper and desired thickness in the field, while the use of the open-mesh material generally only in the center of the module can be used to overcome the differences in center diameter. Thus, the use of an openmesh material as a controlled by-pass is more advantageous than prior-art techniques.

In one embodiment, a single-layer, tubular mesh or netting material, composed of thermoplastic strands; for example, polypropylene or polyethylene, is heat-softened and then slipped as a sock about the module surface, so that on cooling the material is in a close, snugly fitted relationship about the module. The tubular material may be softened, for example, by immersion in hot water or by exposure to hot air.

The mesh material may be retained in various defined thicknesses, so that the desired thickness may be used, to ensure a proper fit with the variation in module diameter. The material usually is composed of uniform open spaces formed by overlapping a single or double layers of strands of the material; for example, 40 to 70 mils in total thickness, with each strand ranging from about 20 to 35 mils in thickness. The strands are at an angle to the axial flow about the module; for example, at an angle of 45 degrees or greater; for example, 45 to 60 degrees, with a strand count of $4 \times 4$ to $10 \times 10$, to provide the desired pressure drop. Materials found suitable for use include extruded polymeric materials known as Vexar material (a trademark of Rohm & Haas Co.) and Naltex material (a trademark of Nalle Company, Inc.).

In another embodiment of the invention, the controlled by-pass mesh material may be left unsecured, such as in sock form, or may be secured in place about the module surface with adhesive, such as epoxy resin. The exterior surface of the membrane module is usually sealed with a polymer or resin, such as an epoxy resin, to present a smooth exterior surface, prior to placing the module in the housing. If desired, the exterior surface of the module or the interior wall surface of the housing may be roughened, embossed or otherwise formed, to present a rough or patterned surface, alone or in combination with the mesh material, to control by-pass in the annular clearance space. For example, the exterior of the module can be molded with a desired uniform, raised pattern on the surface of the module. However, this embodiment does not permit the flexibility of selecting mesh material to adjust for variation in module diameter, as does the use of separate mesh material. However, mesh or other plain, solid sheet material may be used with a molded or formed exterior surface, to provide for controlled by-pass about the module.

The invention will be described in connection with a particular and preferred embodiment; however, it is recognized that various changes and modifications may be made by those persons skilled in the art, all without departing from the spirit and scope of the invention.

DESCRIPTION OF THE EMBODIMENTS

Figure 1:
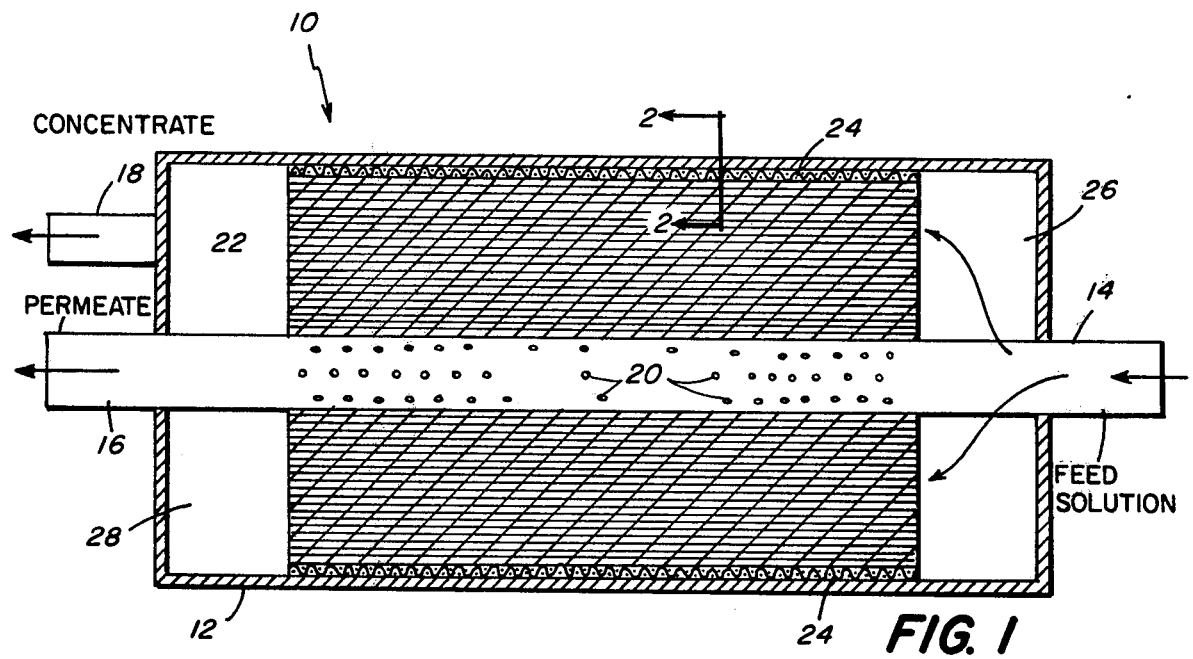
FIG. 1 is a schematic, cross-sectional, axial view of a membrane apparatus, showing a spiral-wound membrane within a module housing.
Figure 2:
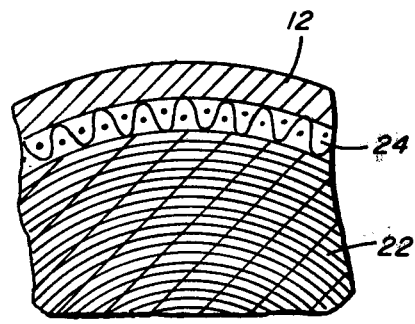
FIG. 2 is a fragmentary, enlarged, cross-sectional view of a portion of FIG. 1 along the lines 2—2.

FIGS. 1 and 2 show a spiral membrane apparatus 10 comprising a housing 12, an inlet 14 for the introduction of a feed solution, a chamber 26 at one end and a chamber 28 at the other end within the housing 12, a central, perforated tube 20, and outlet 16 to withdraw a permeate stream and outlet 18 for the removal of concentrate, a spiral-wound membrane 22 comprising a membrane, a permeate-collector sheet and a spacer spirally wrapped about the central tube 20. The membrane 22 defines an annular clearance space about the membrane in the housing 12. An open-mesh, tubular material 24, comprising an extruded-strand, open-mesh material made of polyethylene or polypropylene; for example; 6×8 strand count, is positioned as a single wrap generally in the central portion and extending along the axial length of the housing to within 1 inch to 4 inches of either end and having a thickness of 40 to 60 mils, each strand about 20 to 30 mils, with the strands at an angle of 45 degrees to the axial flow in the annular space. The open-mesh material 24 provides for controlled by-pass of the feed solution through the open-mesh material; for example, 4 to 12 gpm, in the annular clearance space formed between the smooth interior wall surface of the housing 12 and the smooth epoxy-resin surface of the spiral membrane 22, and provides for the spiral membrane to be fitted snugly within the housing module 12. The tubular, single-layer mesh material is immersed in a hot-water bath and slid about the exterior surface of the membrane module in a softened state.

Figure 3:
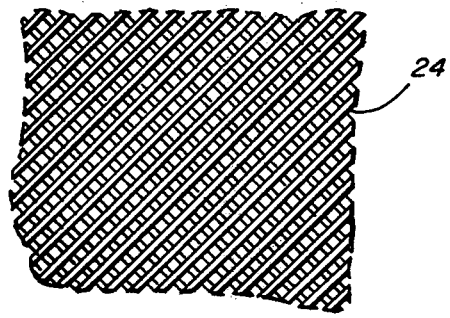
FIG. 3 is a schematic view of the open-mesh material employed in FIG. 1.

FIG. 3 shows the open-mesh material 24, shown in a generally diamond-shaped, extruded-strand pattern.

In operation, a feed solution, such as a concentrated whey solution, is introduced through inlet 14 and into space 26, where it flows axially through the spiral-wound membrane 22. The permeate is recovered from the permeate outlet 16, while the concentrate solution is removed through concentrate outlet 18. The feed solution is permitted to by-pass the open-mesh material 24 in the central portion module at a controlled flow rate, to prevent the buildup of stagnation products on the downstream side of the open-mesh material.

What is claimed is:

1. In a membrane apparatus, which apparatus comprises:

(a) a housing adapted to contain a spiral-membrane module, the housing having an interior wall surface;

(b) a spiral-membrane module positioned within the housing, to define a generally annular clearance space between the exterior surface of the spiral membrane and the interior wall of the housing, the spiral-membrane module designed to separate a feed stream into a permeate stream and a concentrate stream;

(c) means to introduce a feed stream axially of the spiral-membrane module;

(d) means to withdraw a concentrate stream; and (e) means to withdraw a permeate stream, the improvement which comprises: a mesh means peripherally surrounding the spiral membrane in the annular clearance space, the mesh means in a close, partially sealing relationship between the exterior surface of the module and the interior surface of the housing, to provide for a controlled by-pass of the feed stream in the annular clearance space, thereby improving the cleanliness of the clearance space downstream of the open-mesh material, by preventing the accumulation of products in the annular clearance space.

2. The apparatus of claim 1 wherein the mesh means comprises an open-mesh, strand-type material composed of synthetic strands.

3. The apparatus of claim 1 wherein the mesh means comprises a helical wrap of the mesh material about the exterior surface of the spiral-membrane module.

4. The apparatus of claim 1 wherein the mesh means comprises a single wrap of the mesh material about the exterior surface of the membrane module, with the mesh material having abutting edges.

5. The apparatus of claim 1 wherein the mesh means comprises a thermoplastic material composed of generally uniform, open material of extruded strands.

6. The apparatus of claim 1 wherein the mesh means is a mesh material positioned peripherally and generally centrally of the spiral-membrane module within the housing and extends substantially the length of the spiral-membrane module.

7. The apparatus of claim 1 wherein the mesh means is a mesh material having the strands thereon positioned at an angle to the axial flow, and the mesh material is of a predetermined mesh-opening size to control the amount of by-pass through the mesh material.

8. The apparatus of claim 1 wherein the mesh means is a mesh material having a thickness ranging from about 5 to 100 mils in thickness.

9. The apparatus of claim 1 wherein the mesh means is selected to provide for a controlled by-pass flow of from about 4 to 12 gallons per minute.

10. The apparatus of claim 1 wherein the mesh means comprises a tubular, single-layer, thermoplastic, mesh material in a snug, close-fitting relationship about the exterior surface of the spiral-membrane module.

11. The apparatus of claim 1 wherein the spiral-membrane module is characterized by a generally smooth, resin-coated exterior surface.

12. The apparatus of claim 1 wherein the spiral-membrane module is characterized by a roughened, exterior resin surface, to provide for controlled by-pass.

13. The apparatus of claim 1 wherein the spiral-membrane module has a resin exterior surface, and the mesh means comprises a raised, molded, mesh pattern on the exterior surface of the spiral-membrane module.

14. The apparatus of claim 1 wherein the mesh material is a synthetic material composed of strands defining generally uniform, open spaces, having a thickness of from about 5 to 100 mils, and an open-space area of approximately 50% or more.

15. The apparatus of claim 1 wherein the mesh material is composed of strands disposed at an angle of from about 45 to 60 degrees to the axial flow of the feed stream through the annular clearance space, with a strand count of the material ranging from about 4×4 to 10×10.

16. The apparatus of claim 1 wherein the mesh material extends from about 1 to 4 inches from either end of the spiral-membrane module.

17. In a membrane apparatus, which apparatus comprises:
(a) a housing adapted to contain a spiral-membrane module, the housing having an interior wall surface;
(b) a spiral-membrane module positioned within the housing, to define a generally annular clearance space between the exterior surface of the spiral-membrane module and the interior wall surface of the housing, the spiral-membrane module designed to separate a feed stream into a permeate stream and a concentrate stream; P1 (c) means to introduce a feed stream axially of the spiral-membrane module;
(d) means to withdraw a concentrate stream; and
(e) means to withdraw a permeate stream, the improvement which comprises: an open-mesh, strand-type, tubular, sheet material composed of synthetic strands and peripherally surrounding the spiral-membrane module and positioned in the annular clearance space and extending substantially the length of the spiral membrane, the mesh material having a thickness ranging from about 5 to 100 mils in thickness and being in a close, partially sealing relationship between the exterior surface of the spiral-membrane module and the interior wall surface of the housing, to provide for a controlled by-pass of the feed stream in the annular clearance space, thereby improving the cleanliness of the clearance space downstream of the open-mesh material, by preventing the accumulation of products in the annular clearance space.

18. The apparatus of claim 17 wherein the mesh material comprises a thermoplastic material composed of generally uniform, open material of extruded strands, with the strands at an angle of 45 degrees or more to the axial flow in the annular space.

19. A method of controlling the amount of feed-stream by-pass in a spiral-membrane module, wherein the apparatus comprises:
(a) a housing adapted to contain a spiral-membrane module, the housing having an interior wall surface;
(b) a spiral-membrane module positioned within the housing, to define a generally annular clearance space between the exterior surface of the spiral-membrane module and the interior wall surface of the housing, the spiral-membrane module designed to separate a feed stream into a permeate stream and a concentrate stream;
(c) means to introduce a feed stream axially of the spiral-membrane module;
(d) means to withdraw a concentrate stream; and
(e) means to withdraw a permeate stream, the improvement which comprises; axially flowing a controlled by-pass amount of the feed stream about the exterior surface of the spiral-membrane module and through the annular clearance space in a tortuous flow path through and about an open-mesh-type material in the annular clearance space, to permit a controlled amount of feed stream by-pass to pass through the annular clearance space and to prevent the accumulation of products from the feed stream in the annular clearance space.

20. The method of claim 19 wherein the mesh material is selected to provide for a controlled by-pass flow of from about 4 to 12 gallons per minute.

21. The method of claim 19 wherein the mesh material has the strands thereon positioned at an angle to the axial flow through the annular space, and the mesh material is of a predetermined mesh-opening size to control the amount of by-pass through the mesh material.

22. The method of claim 19 wherein the mesh material is a tubular material and is positioned peripherally and generally centrally of the spiral-membrane module within the housing and extends substantially the length of the spiral-membrane module.

23. The method of claim 19 wherein the spiral-membrane module has a resin surface, and the mesh material is formed by molding a mesh pattern peripherally in and about the exterior surface of the spiral-membrane module.

24. The method of claim 19 which includes heat-softening a tubular, thermoplastic mesh material formed of strands and having a thickness of from 5 to 100 mils, and slipping the softened mesh material about the periphery of the exterior surface of the spiral-membrane module and extending substantially the length of the spiral-membrane module, to provide, on cooling of the mesh material, a snug-fitted, tubular mesh material.

* * * * *